(12) United States Patent
Parkinson (10) Patent No.: US 8,135,950 B2
(45) Date of Patent: Mar. 13, 2012

(54) METHOD AND APPARATUS FOR MANAGING DIGITAL CERTIFICATES

(75) Inventor: Steven W. Parkinson, San Jose, CA (US)

(73) Assignee: Red Hat, Inc., Raleigh, NC (US)

( * ) Notice: Subject to any disclaimer, the term of this patent is extended or adjusted under 35 U.S.C. 154(b) by 1008 days.

(21) Appl. No.: 11/712,278

(22) Filed: Feb. 27, 2007

(65) Prior Publication Data

US 2008/0209208 A1 Aug. 28, 2008

(51) Int. Cl.
*H04L 29/06* (2006.01)

(52) U.S. Cl. ........ 713/156; 713/157; 713/161; 713/175; 713/180; 726/10; 726/20; 726/21

(58) Field of Classification Search .............. 726/10–21; 713/156, 176, 180

See application file for complete search history.

(56) References Cited

U.S. PATENT DOCUMENTS

| | | | |
|---|---|---|---|
| 6,640,301 B1* | 10/2003 | Ng ................................ | 713/156 |
| 7,251,728 B2* | 7/2007 | Toh et al. ..................... | 713/156 |
| 7,484,089 B1* | 1/2009 | Kogen et al. .................. | 713/156 |
| 7,562,212 B2* | 7/2009 | Beattie et al. ................. | 713/156 |
| 7,644,270 B1* | 1/2010 | Cherukumudi et al. ...... | 713/156 |
| 7,653,008 B2* | 1/2010 | Patrick et al. ................. | 370/254 |
| 7,664,947 B2* | 2/2010 | Fang ............................. | 713/152 |
| 2002/0026575 A1* | 2/2002 | Wheeler et al. ............... | 713/156 |
| 2002/0059144 A1* | 5/2002 | Meffert et al. ................ | 705/51 |
| 2003/0051134 A1* | 3/2003 | Gupta ............................ | 713/156 |
| 2003/0126431 A1* | 7/2003 | Beattie et al. ................. | 713/156 |
| 2003/0149740 A1* | 8/2003 | Wookey et al. ............... | 709/217 |
| 2005/0198170 A1* | 9/2005 | LeMay et al. ................. | 709/206 |
| 2005/0246534 A1* | 11/2005 | Kirkup et al. ................. | 713/170 |
| 2005/0257057 A1* | 11/2005 | Ivanov et al. ................. | 713/171 |
| 2006/0059333 A1* | 3/2006 | Gentry et al. ................. | 713/156 |
| 2006/0064581 A1* | 3/2006 | Miller et al. .................. | 713/156 |
| 2006/0075222 A1* | 4/2006 | Moloney et al. .............. | 713/156 |
| 2006/0200661 A1* | 9/2006 | Doonan et al. ................ | 713/156 |
| 2006/0259762 A1* | 11/2006 | Tanimoto ...................... | 713/156 |
| 2007/0083749 A1* | 4/2007 | Fang ............................. | 713/152 |
| 2009/0235069 A1* | 9/2009 | Sonnega et al. ............... | 713/156 |

OTHER PUBLICATIONS

R. Housley, "Cryptographic Message Syntax (CMS)", Network Working Group, Request for Comments: 3369, RSA Laboratories, Aug. 2002, Category Standards Track, pp. 1-48, htto://rfc.net.rfc3369.html.

B. Ramsdell, Editor, "Secure/<ultipurpose Internet Mail Extensions (S/MIME) Version 3.1", Network Working Group, Request for Comments: 3851, Category Standards Track, Sendmail, Inc., Jul. 2004, pp. 1-30, http:www.apps.ietf.org/rfc/rfc3851.html.

* cited by examiner

*Primary Examiner* — Nathan Flynn
*Assistant Examiner* — Viral Lakhia
(74) *Attorney, Agent, or Firm* — Lowenstein Sandler PC (57) ABSTRACT

Method and apparatus for managing digital certificates are described herein. In one embodiment, an encryption certificate is extracted from an email received from an owner of the encryption certificate, where the encryption certificate being issued from a trusted party other than the owner. Then the encryption certificate is associated with an entry of a directory based on an identity (ID) of the owner, where the directory provides directory services to one or more email servers. Other methods and apparatuses are also described.

22 Claims, 5 Drawing Sheets

Fig. 1

From: john_doe@sender.com   205

To: certificate_bot@directory.com   201

Title:   206

...

Signature: <xxxxx>   202

Signature Certificate: <xxxxx>   203

Encryption Certificate: <xxxxx>   204
...

Email
200

Fig. 2

User ID: John Doe

Mail: John_Doe@Sender.com

User Certificate 1: < xxxxx >

User Certificate 2: < xxxxx >

...

User Certificate N: < xxxxx >

Certificate Entry
300

METHOD AND APPARATUS FOR MANAGING DIGITAL CERTIFICATES

FIELD

The present invention relates generally to digital certificates. More particularly, this invention relates to managing digital certificates.

BACKGROUND

The use of digital certificates using public and private key encryption methods is widely known in the field of computing, particularly networked computing. Digital certificates generally follow the X.509 standard, developed by the International Standards Organization (ISO). These certificates create a binding between an entity's public key and its identity. Obtaining authentic copies of public key certificates is critical in deploying secure public key systems. Often a digital certificate is stored in a publicly accessible repository such as an LDAP (lightweight directory access protocol) or X.500 directory.

Typically, when a digital certificate is requested by a user and issued from a certificate authority or certifying authority (CA), the CA would normally distribute the digital certificate to a directory service provider to publish the digital certificate in a directory. However, under certain circumstances, a digital certificate may be obtained from a trusted party that would not normally distribute to the directory server provider. There has been a lack of mechanism to allow a user to publish a digital certificate in a directory.

BRIEF DESCRIPTION OF THE DRAWINGS

The present invention is illustrated by way of example and not limitation in the figures of the accompanying drawings in which like references indicate similar elements.

DETAILED DESCRIPTION

In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

As mentioned above, for people who have received a certificate from an organization's CA, the CA is usually automatically configured to add the certificate to an LDAP directory when the certificate is issued. However, a user may have a certificate received through other means and also wish to place that certificate in the directory so that others may find it. According to certain embodiments of the invention, a mechanism (e.g., an email bot or a certificate handler) is provided to allow a user to send an email or message to request for storing or updating a user's certificate in the directory. For example, a user may send a signed email (e.g., with a digital signature or signature certificate). In addition, the mail may include or attach an encryption certificate of the user, where the encryption certificate allows others to send an encrypted email (e.g., encrypted by the encryption certificate) to the user.

In response, according to one embodiment, the certificate handler may pull apart the signed email; extract the certificate (e.g., encryption certificate) from the email; and store the extracted certificate in the directory which is publicly accessible by others. The certificate handler may be equipped with a set of root certificates that the certificate handler trusts, which may be used to verify the signature that signs the email and/or the certificates (e.g., encryption certificate) extracted from the email. Note that throughout this application, this mechanism (e.g., certificate handler) will be described to store an encryption certificate in an entry of a directory (e.g., an LDAP directory). However, it is not so limited, such a mechanism may also be used to update (e.g., add, delete, modify, and/or query) an entry of certificate within a directory. In addition, a certificate stored within an entry of the directory is not limited to an encryption certificate; other types of digital certificates may also be applied. Further, a directory is not limited to an LDAP directory; other types of directories (e.g., X.509) may also be applied.

Figure 1:
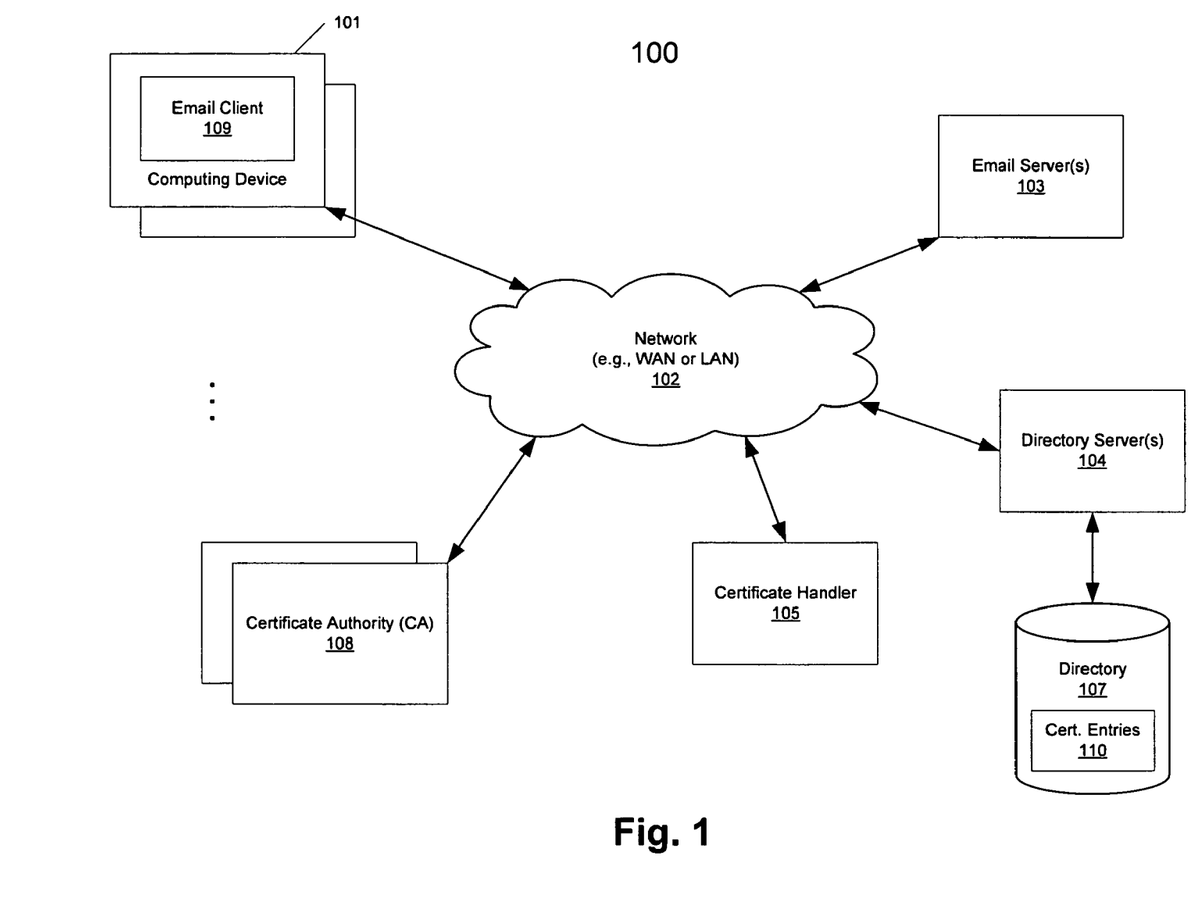
FIG. 1 is a block diagram illustrating a network configuration which may be used with an embodiment of the invention.

FIG. 1 is a block diagram illustrating a network configuration which may be used with an embodiment of the invention. Referring to FIG. 1, network configuration 100 includes, but is not limited to, a computing device 101 having an email client application 109 communicatively coupled to an email server 103 over a network 102. Computing device 101 may be any computing device capable of sending and receiving messages over a network, such as, for example, an individual computer, cellular phone, or PDA (personal digital assistant), etc. Email client 109 may be any email application, such as, for example, OUTLOOK™, EUDORA™, etc.

Email server 103 is configured to handle outgoing and incoming emails for email client 109, using a variety of communication protocols, such as, for example, SMTP (simple mail transfer protocol), IMAP (Internet message access protocol) or POP3 (post office protocol 3). Network 102 may be a wide area network (e.g., Internet) or a local area network (e.g., Intranet). The network connections may be wired, wireless, or a combination of both wired and wireless. Network 102 may include multiple sub-networks.

In addition, network configuration 100 includes a directory server 104 for providing directory services to email client 109 and/or email server 103. Directory server 104 may be coupled to a directory repository 107 (also simply referred to as a directory) for storing email related information, such as, for example, digital certificates 110.

A directory service is a software application or a set of applications that stores and organizes information about a computer network's users and network resources, and that allows network administrators to manage users' access to the resources. Additionally, directory services act as an abstraction layer between users and shared resources.

A simple directory service called a naming service maps the names of network resources to their respective network addresses. With the name service type of directory, a user does not have to remember the physical address of a network resource; providing a name will locate the resource. Each resource on the network is considered an object on the directory server. Information about a particular resource is stored as attributes of that object. Information within objects can be made secure so that only users with the available permissions are able to access it.

A directory service defines the namespace for the network. A namespace in this context is the term that is used to hold one or more objects as named entries. The directory design process normally has a set of rules that determine how network resources are named and identified. The rules specify that the names be unique and unambiguous.

Referring back to FIG. 1, directory 107 may be an LDAP compatible directory. An LDAP directory is supported by an LDAP engine, server, or application that performs storage and retrieval processes with respect to a database in accordance with the LDAP protocol. LDAP directory entries can store many information items, such as, a subject's name, organization, etc; a subject's digital certificate would be stored within a directory entry in association with other information for a subject.

Further, according to one embodiment, network configuration 100 includes a certificate handler 105 (also referred to as an email handler) coupled to network 102 and accessible by server 103. Certificate handler 105 is configured to handle any certificates received from email clients 109 and to store or update the corresponding certificate entry in directory 107 associated with the user. In one embodiment, the email client 109 sends an email signed with a digital signature (e.g., with a signature certificate) and/or embedded or attached with a digital certificate (e.g., an encryption certificate) to server 103. In response, server 103 invokes certificate handler 105 to handle the digital certificate(s) within the email. The certificate handler 105 in turn accesses, via directory server 104, directory 107 to update the corresponding certificate entry with respect to the digital certificates from the email.

A digital certificate is a digital document that vouches for the identity and key ownership of entities, such as an individual, a computer system, a specific server routing on that system, etc. Certificates are issued by certificate authorities (CAs), such as CAs 108. A CA is an entity, usually a trusted third party to a transaction, that is trusted to sign or issue certificates for other people or entities. A CA usually has some kind of legal responsibilities for its vouching of the binding between a public key and its owner that allow one to trust the entity that signed a certificate. There are many such certificate authorities, such as VeriSign, Entrust, etc. These authorities are responsible for verifying the identity and key ownership of an entity when issuing the certificate.

Referring back to FIG. 1, according to one embodiment, certificate handler 105 receives an email from email client 109 to specifically request for updating a certificate entry (e.g., certificate entry 110) associated with the email client 109. As mentioned above, such an email may be signed with a digital signature (e.g., signature certificate) and may include or attach an encryption certificate therein, similar to an email example as shown in FIG. 2.

Figure 2:
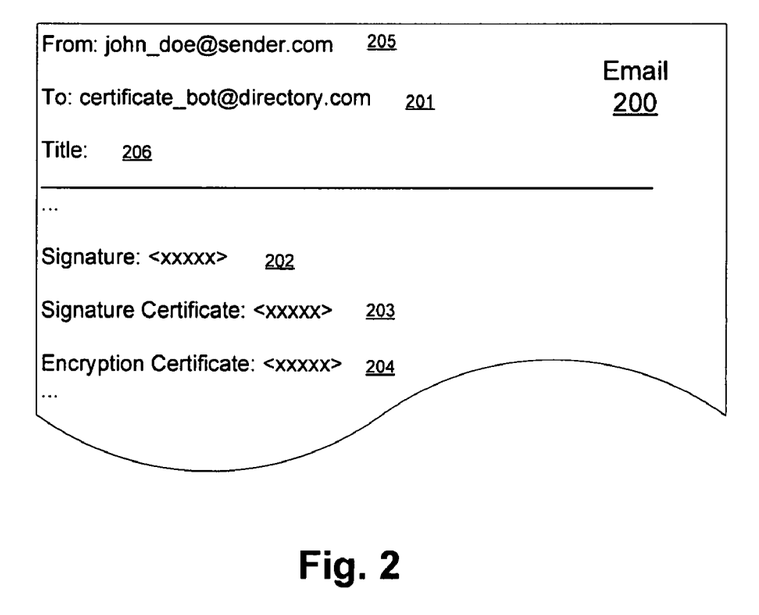
FIG. 2 is an example of an email which may be used with one embodiment of the invention.

Referring to FIGS. 1 and 2, according to one embodiment, email 200 is sent to a dedicated email destination address 201 from an email client identified via a source email address 205. Email 200 may be signed by a digital signature 202 and authorized via a signature certificate 203 issued by a CA (e.g., CA 108). For example, email 200 may be an S/MIME (secure/multipurpose Internet mail extension) compatible email. In addition, email 200 may include or attach encryption certificate 204 (e.g., an encryption certificate of a sender who sends email 200) issued by a CA (e.g., CA 108). Signature certificate 203 and encryption certificate 204 may be issued by the same or different CAs. Further, title field 206 of email 200 may be used to specifically request certain actions in updating a certificate entry, such as, for example, adding, deleting, modifying, or querying a specific certificate entry. Alternatively, the body of email 200 may also be used for similar purposes.

Referring back to FIG. 1, in order to allow other users to send an encrypted email to email client 109, email client 109 has to publish its encryption certificate (typically including its public key) in directory 107. When another user wishes to send client 109 an encrypted email, that user can look up in the directory 107 to retrieve the encryption certificate of client 109 and use the retrieved encryption certificate to encrypt the email. Such an encrypted email can then be decrypted (using a corresponding private key) by client 109 as a recipient.

Figure 3:
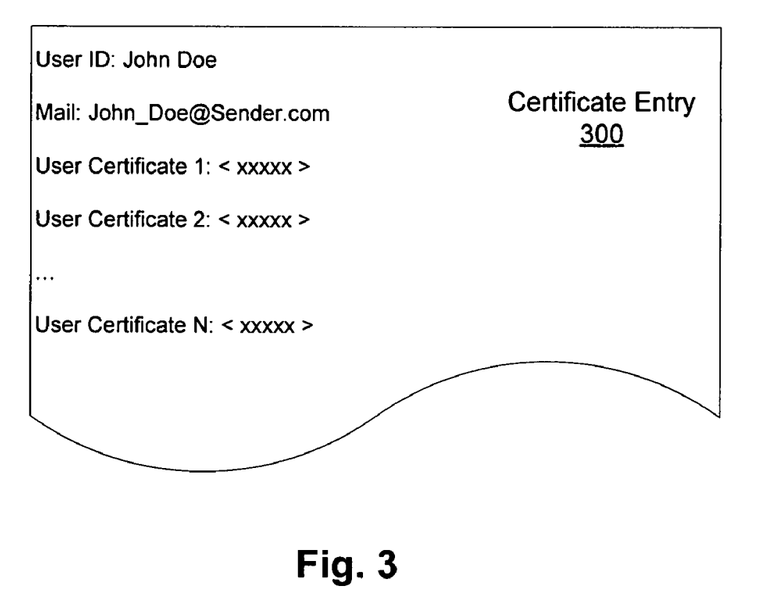
FIG. 3 is an example of a directory entry according to one embodiment of the invention.

According to one embodiment, to publish an encryption certificate of client 109, client 109 sends a specific email to server 103. Upon receiving such an email, server 103 invokes certificate handler 105. Certificate handler 105 may be implemented as part of server 103 or alternatively, it may be implemented remotely and accessible by server 103. Certificate handler 105 may parse the email to extract one or more certificates from the email and update (e.g., adding, deleting, modifying, or querying) the corresponding entry in directory 107. For the purpose of illustration only, an example of a certificate entry is shown in FIG. 3. Note that entry 300 of FIG. 3 is shown for purpose of illustration only; each entry may include one or more certificates. Other formats may exist.

Figure 4:
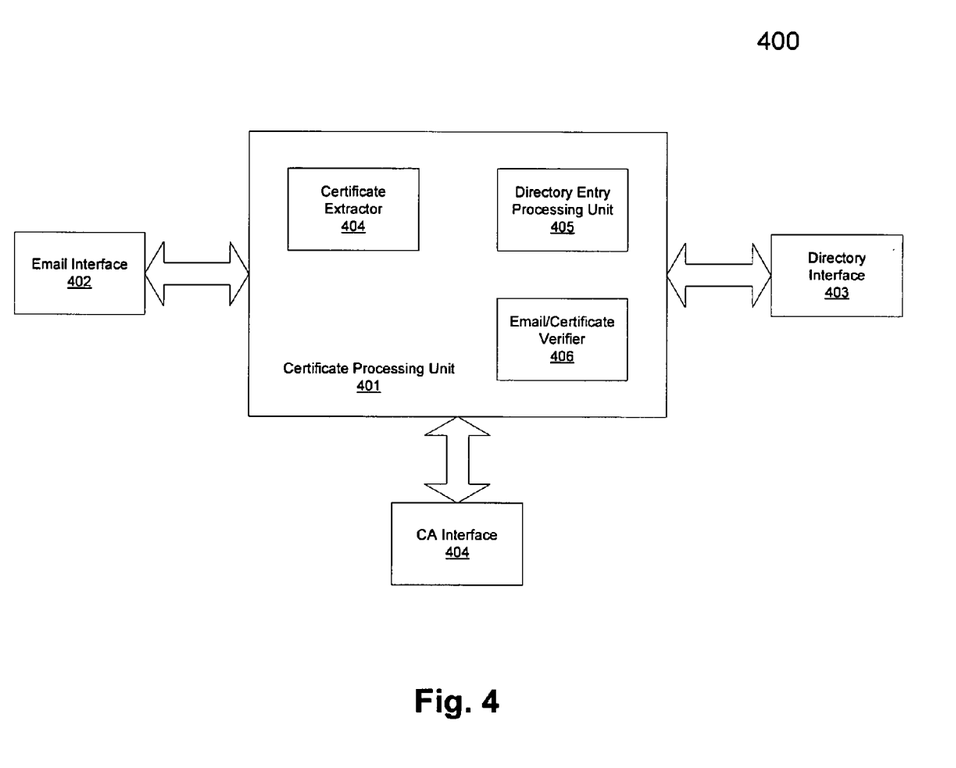
FIG. 4 is a block diagram illustrating an example of a certificate handler according to one embodiment of the invention.

FIG. 4 is a block diagram illustrating an example of a certificate handler according to one embodiment of the invention. For example, certificate handler 400 may be implemented as part of certificate handler 105 of FIG. 1. Referring to FIG. 4, in one embodiment, certificate handler 400 includes, but is not limited to, a certificate processing unit 401 which can communicate with an email facility (e.g., email server 103 of FIG. 1) via email interface 402 to receive an email to request updating a certificate entry of a directory communicatively coupled to certificate processing unit 401 via directory interface 403. In addition, certificate processing unit 401 may communicate with one or more CAs via CA interface 404 to obtain certain trusted roots for verifying emails (e.g., digital signatures or signature certificates) and/or other digital certificates (e.g., encryption certificates).

In one embodiment, certificate processing unit 401 includes, but is not limited to, certificate extractor 404, directory entry processing unit 405, and email/certificate verifier 406. Upon receiving an email to request for updating a certificate entry, certificate extractor 404 is configured to parse the email to locate the certificates (e.g., encryption certificate and/or signature certificate) within the email and to extract the certificates from the email.

In one embodiment, verifier 406 is configured to determine from the certificates identity information about the owner of the certificates (e.g., full name and/or email address). In addition, according to one embodiment, verifier 406 may optionally verify that the email message is signed by a proper signature certificate issued by a proper CA (e.g., CA 108 of FIG. 1). Verifier 406 may maintain trust roots of certain CAs used by a client (e.g., client 109 of FIG. 1). Such trust roots may be used for verification purposes (e.g., verifying signature certificate or encryption certificate).

Further, according to one embodiment, the certificate handler 400 may optionally verify the ownership of the signature certificate and the encryption certificate from the email. In a particular embodiment, verifier 406 may match the identity information stored in a predetermined field of the signature certificate, which the email was signed with, with the identity information in the encryption certificate. For example, verifier 406 may verify an email address specified within a "subject alternative name" (e.g., "subjectAltName", also referred to as a subject alternative name extension) field of a signature certificate against the corresponding one in an encryption certificate. The subject alternative name extension allows various literal values to be included in the configuration file. These include an email address, URI (uniform resource indicator), DNS (domain name), RID (a registered ID: object identifier), IP address, a distinguished name, etc.

Thereafter, directory entry processing unit 405 looks up, via directory interface 403, in a directory (e.g., directory 107 of FIG. 1) to locate a corresponding entry associated with the owner of the encryption certificate. If there is no existing entry, directory entry processing unit 405 may optionally create a new entry and store the new encryption certificate in the new entry. Note that some or all of the components as shown in FIG. 4 may be implemented in hardware, software, or a combination of both. Other configurations may exist.

Figure 5:
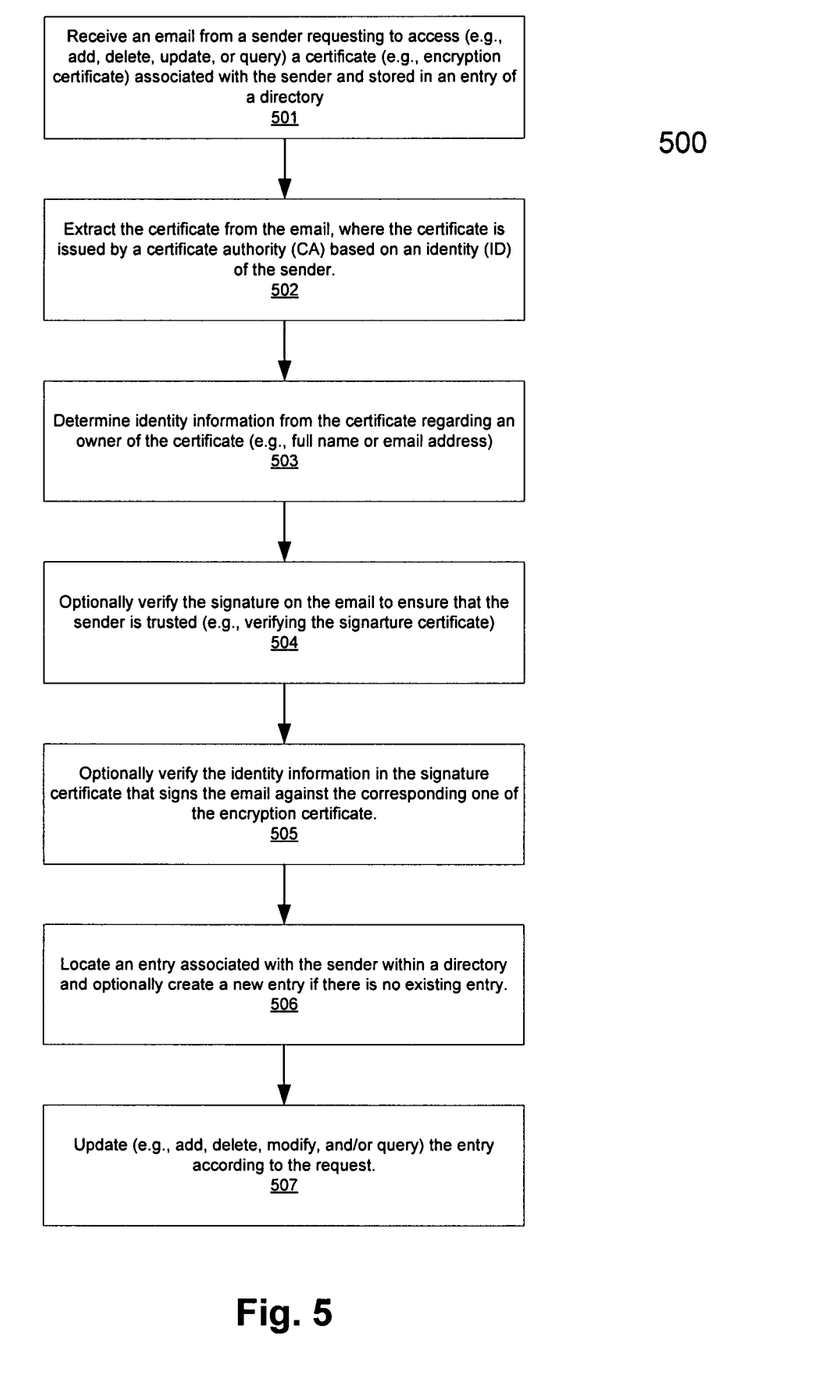
FIG. 5 is a flow diagram illustrating a process for managing digital certificates according to one embodiment of the invention.

FIG. 5 is a flow diagram illustrating a process for managing digital certificates according to one embodiment of the invention. Note that process 500 may be performed by processing logic which may include hardware (circuitry, dedicated logic, etc.), software (such as is run on a general purpose computer system or a dedicated machine), or a combination of both. For example, process 500 may be performed by certificate handler 400 of FIG. 4. Referring to FIG. 5, at block 501, processing logic receives an email from a sender to request accessing (e.g., add, delete, modify and/or query) a certificate (e.g., encryption certificate) associated with the sender and stored within an entry of a directory. The email may be signed with a digital signature and may include or attach an encryption certificate of the sender. At block 502, processing logic extracts the certificate from the email, where the certificate is issued from a CA based on an identity (ID) of the sender.

At block 503, processing logic determines identity (ID) information from the certificate (e.g., signature certificate and/or encryption certificate) regarding an owner of the certificate, such as, for example, name and/or email address of the owner. At block 504, processing logic optionally verifies the signature on the email to ensure that the sender is trusted, for example, by verifying the associated signature certificate. At block 505, processing logic optionally verifies the identity information of the signature certificate that signs the email against the identity information of the encryption certificate. The identity information from both certificates should match since they are owned by the same person or entity. Once all the identity information has been verified, at block 506, processing logic looks up in a directory to locate an existing entry associated with an owner of the certificates and optionally, creates a new entry if there is no existing entry in the directory. At block 507, processing logic updates the entry according to an instruction (e.g., add, delete, modify, and/or query) of the email. Other operations may also be performed.

Figure 6:
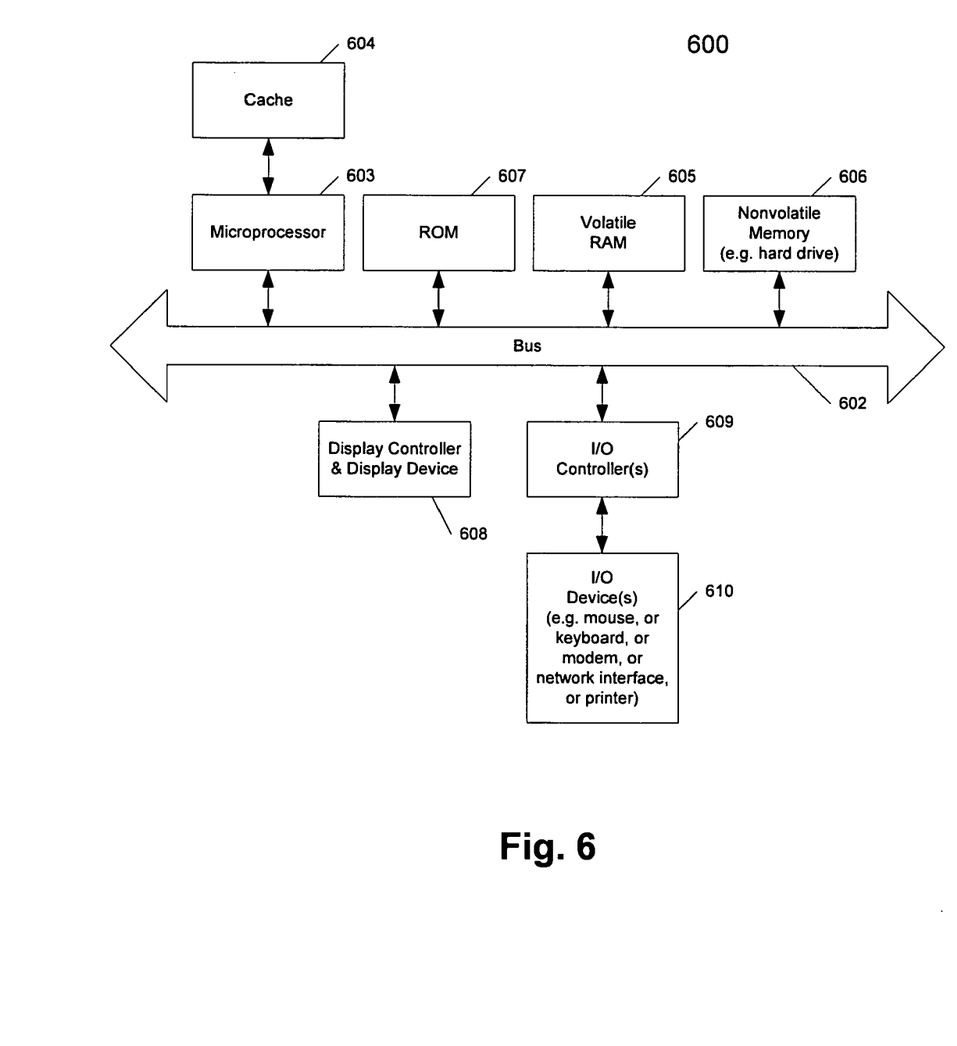
FIG. 6 is a block diagram of a digital processing system, which may be used with one embodiment of the invention.

FIG. 6 is a block diagram of a digital processing system, which may be used with one embodiment of the invention. For example, the system 600 may be used as a client and/or a server as described above with respect to FIG. 1. Alternatively, system 600 may be implemented as a certificate handler 400 of FIG. 4. Note that while FIG. 6 illustrates various components of a computer system, it is not intended to represent any particular architecture or manner of interconnecting the components; as such details are not germane to the present invention. It will also be appreciated that network computers, handheld computers, cell phones and other data processing systems which have fewer components or perhaps more components may also be used with the present invention.

As shown in FIG. 6, the system 600, which is a form of a data processing system, includes a bus or interconnect 602 which is coupled to one or more microprocessors 603 and a ROM 607, a volatile RAM 605, and a non-volatile memory 606. The microprocessor 603 is coupled to cache memory 604 as shown in the example of FIG. 6. Processor 603 may be, for example, a PowerPC microprocessor or an Intel compatible processor. Alternatively, processor 603 may be a digital signal processor or processing unit of any type of architecture, such as an ASIC (Application-Specific Integrated Circuit), a CISC (Complex Instruction Set Computing), RISC (Reduced Instruction Set Computing), VLIW (Very Long Instruction Word), or hybrid architecture, although any appropriate processor may be used.

The bus 602 interconnects these various components together and also interconnects these components 603, 607, 605, and 606 to a display controller and display device 608, as well as to input/output (I/O) devices 610, which may be mice, keyboards, modems, network interfaces, printers, and other devices which are well-known in the art.

Typically, the input/output devices 610 are coupled to the system through input/output controllers 609. The volatile RAM 605 is typically implemented as dynamic RAM (DRAM) which requires power continuously in order to refresh or maintain the data in the memory. The non-volatile memory 606 is typically a magnetic hard drive, a magnetic optical drive, an optical drive, or a DVD RAM or other type of memory system which maintains data even after power is removed from the system. Typically, the non-volatile memory will also be a random access memory, although this is not required.

While FIG. 6 shows that the non-volatile memory is a local device coupled directly to the rest of the components in the data processing system, embodiments of the present invention may utilize a non-volatile memory which is remote from the system; such as, a network storage device which is coupled to the data processing system through a network interface such as a modem or Ethernet interface. The bus 602 may include one or more buses connected to each other through various bridges, controllers, and/or adapters, as is well-known in the art. In one embodiment, the I/O controller 609 includes a USB (Universal Serial Bus) adapter for controlling USB peripherals. Alternatively, I/O controller 609 may include an IEEE-1394 adapter, also known as FireWire adapter, for controlling FireWire devices.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description below. In addition, embodiments of the present invention are not described with reference to any particular programming language. It will be appreciated that a variety of programming languages may be used to implement the teachings of embodiments of the invention as described herein.

A machine-readable medium may include any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for managing digital, certificates, the method comprising:
    receiving, at a certificate handler, over a network an email from a user, the email including an encryption certificate having a public key associated with the user, the email requesting the encryption certificate to be added into a directory of an email directory server that provides email directory services to one or more email servers, wherein the email directory server is a lightweight directory access protocol (LDAP) server;
    extracting, by the certificate handler, the encryption certificate from the email, the encryption certificate being issued from a certificate authority other than the user, wherein the certificate handler and the user are separate entities;
    obtaining, by the certificate handler, a root certificate from the certificate authority, the root certificate corresponding to the encryption certificate;
    authenticating, by the certificate handler, the encryption certificate using the root certificate, wherein the certificate handler is a separate entity from the certificate authority; and
    upon successfully authenticating the encryption certificate, the certificate handler causing the encryption certificate to be stored in an entry of the directory of the email directory server based on an identity (ID) of the user, such that other users can obtain the encryption certificate from the email directory server to send an encrypted email to the user using the public key of the encryption certificate, wherein the encrypted email is to be decrypted by the user using a private key corresponding to the public key.

2. The method of claim 1, further comprising:
    locating an existing entry associated with the user within the directory;
    upon successfully locating the existing entry, updating the existing entry with the extracted encryption certificate; and
    publishing the updated encryption certificate in a network community.

3. The method of claim 1, further comprising adding a new entry based on the ID of the user, if there is no existing entry associated with the user in the directory.

4. The method of claim 1, wherein the email is signed by the user using a signature certificate that is different than the encryption certificate.

5. The method of claim 4, further comprising verifying the signature certificate to confirm that the email is received from the user prior to storing the encryption certificate in the email directory server.

6. The method of claim 5, further comprising matching a first email address extracted from a first subject alternative name extension field of the signature certificate and a second email address extracted from a second subject alternative name extension field of the encryption certificate.

7. The method of claim 1, wherein the email is directed to a predetermined destination address to request for updating the entry associated with the user, including at least one of adding, deleting, modifying, and querying the entry in the directory.

8. The method of claim 1, wherein the directory is an LDAP (lightweight directory access protocol) compatible directory, and the ID of the owner comprises at least one of a name and email address associated with the user.

9. A non-transitory machine-readable medium having instructions, which when executed, cause a processor to perform a method for managing digital certificates, the method comprising:
    receiving, at a certificate handler, over a network an email from a user, the email including an encryption certificate having a public key associated with the user, the email requesting the encryption certificate to be added into a directory of an email directory server that provides email directory services to one or more email servers, wherein the email directory server is a lightweight directory access protocol (LDAP) server;

extracting, by the certificate handler, the encryption certificate from the email, the encryption certificate being issued from a certificate authority other than the user, wherein the certificate handler and the user are separate entities;

obtaining, by the certificate handler, a root certificate from the certificate authority, the root certificate corresponding to the encryption certificate;

authenticating, by the certificate handler, the encryption certificate using the root certificate, wherein the certificate handler is a separate entity from the certificate authority; and upon successfully authenticating the encryption certificate, the certificate handler causing the encryption certificate to be stored in an entry of the directory of the email directory server based on an identity (ID) of the user, such that other users can obtain the encryption certificate from the email directory server to send an encrypted email to the user using the public key of the encrypted certificate, wherein the encrypted email is to be decrypted by the user using a private key corresponding to the public key.

10. The non-transitory machine-readable medium of claim 9, wherein the method further comprises:

locating an existing entry associated with the user within the directory;

upon successfully locating the existing entry, updating the existing entry with the extracted encryption certificate; and publishing the updated encryption certificate in a network community.

11. The non-transitory machine-readable medium of claim 9, wherein the method further comprises adding a new entry based on the ID of the user, if there is no existing entry associated with the user in the directory.

12. The non-transitory machine-readable medium of claim 1, wherein the email is signed by the user using a signature certificate that is different than the encryption certificate.

13. The non-transitory machine-readable medium of claim 12, wherein the method further comprises verifying the signature certificate to confirm that the email is received from the user prior to storing the encryption certificate in the email directory server.

14. The non-transitory machine-readable medium of claim 13, wherein the method further comprises matching a first email address extracted from a first subject alternative name extension field of the signature certificate and a second email address extracted from a second subject alternative name extension field of the encryption certificate.

15. The non-transitory machine-readable medium of claim 1, wherein the email is directed to a predetermined destination address to request for updating the entry associated with the user, including at least one of adding, deleting, modifying, and querying the entry in the directory.

16. The non-transitory machine-readable medium of claim 1, wherein the directory is an LDAP (lightweight directory access protocol) compatible directory, and the ID of the owner comprises at least one of a name and email address associated with the user.

17. An apparatus for managing digital certificates, comprising:

an extractor to extract an encryption certificate from an email received from a user as an owner of the encryption certificate including a public key associated with the user, the encryption certificate being issued from a certificate authority other than the owner, wherein the email requests the encryption certificate to be added into a directory of an email directory server that provides email directory services to one or more email servers, wherein the email directory server is a lightweight directory access protocol (LDAP) server;

an encryption certificate verifier coupled to the extractor to obtain a root certificate from the certificate authority and to verify the encryption certificate using the root certificate; and a directory entry processing unit coupled to the extractor and the encryption certificate verifier, upon successfully verifying the encryption certificate, to store the encryption certificate in an entry of the directory of the email directory server based on an identity (ID) of the owner, such that other users can obtain the encryption certificate from the email directory server to send an encrypted email to the user using the public key of the encryption certificate, wherein the encrypted email is to be decrypted by the user using a private key corresponding to the public key.

18. The apparatus of claim 17, wherein the email is signed by the user using a signature certificate that is different than the encryption certificate.

19. The apparatus of claim 18, further comprising a signature verifier configured to verify the signature certificate to confirm that the email is received from the owner of the encryption certificate prior to storing the encryption certificate in the email directory server.

20. The apparatus of claim 19, wherein the signature verifier is configured to match a first email address extracted from a first subject alternative name extension field of the signature certificate and a second email address a second subject alternative name extension field of the encryption certificate.

21. The apparatus of claim 17, wherein the directory entry processing unit is configured to:

locate an existing entry associated with the owner of the encryption certificate within the directory, upon successfully locating the existing entry, update the existing entry with the extracted encryption certificate, and cause the directory to publish the updated encryption certificate in a network community.

22. The apparatus of claim 17, wherein the directory entry processing unit is configured to add a new entry based on the ID of the owner of the encryption certificate, if there is no existing entry associated with the owner of the encryption certificate in the directory.

* * * * *